(12) United States Patent
Shinozaki

(10) Patent No.: US 6,173,392 B1
(45) Date of Patent: Jan. 9, 2001

(54) PREFETCH CONTROLLER AUTOMATICALLY UPDATING HISTORY ADDRESSES

(75) Inventor: Takashi Shinozaki, deceased, late of Saitama (JP), by Mayumi Shinozaki, legal representative

(73) Assignee: NEC Corporation, Tokyo (JP)

( * ) Notice: Under 35 U.S.C. 154(b), the term of this patent shall be extended for 0 days.

(21) Appl. No.: 09/205,709

(22) Filed: Dec. 4, 1998

(30) Foreign Application Priority Data

Apr. 12, 1997 (JP) .................................... 9-334061

(51) Int. Cl.[7] ........................................ G06F 9/30
(52) U.S. Cl. ...................... 712/207; 711/213; 711/217; 711/218
(58) Field of Search .................... 712/207, 205, 712/239; 711/204, 205, 213, 217, 218, 219, 220, 3, 118, 137

(56) References Cited

U.S. PATENT DOCUMENTS

| | | | |
|---|---|---|---|
| 5,093,777 | * 3/1992 | Ryan ........................................ | 711/3 |
| 5,210,838 | * 5/1993 | Jensen ................................. | 711/213 |
| 5,357,618 | * 10/1994 | Mirza et al. ............................. | 711/3 |
| 5,426,764 | * 6/1995 | Ryan ................................... | 711/204 |
| 5,495,591 | * 2/1996 | Ryan ................................... | 711/213 |
| 5,499,355 | * 3/1996 | Krishnamohan et al. ........... | 711/137 |
| 5,611,065 | * 3/1997 | Alferness et al. ................... | 711/220 |
| 5,619,676 | * 4/1997 | Fukuda et al. ....................... | 711/137 |
| 5,694,572 | * 12/1997 | Ryan ................................... | 711/711 |
| 5,701,426 | * 12/1997 | Ryan ........................................ | 711/3 |
| 5,790,823 | * 8/1998 | Puzak et al. .......................... | 712/207 |
| 5,854,921 | * 12/1998 | Pickett ................................ | 712/239 |
| 5,953,512 | * 9/1999 | Cai et al. ............................. | 712/205 |

FOREIGN PATENT DOCUMENTS

| | | |
|---|---|---|
| 50-96143 | 7/1975 | (JP) . |
| 2-10450 | 1/1990 | (JP) . |
| 2-133842 | 5/1990 | (JP) . |
| 2-287828 | 11/1990 | (JP) . |
| 3-63852 | 3/1991 | (JP) . |
| 5-181748 | 7/1993 | (JP) . |
| 6-51982 | 2/1994 | (JP) . |
| 6-314241 | 11/1994 | (JP) . |
| 6-342403 | 12/1994 | (JP) . |
| 7-64862 | 3/1995 | (JP) . |
| 7-506921 | 7/1995 | (JP) . |
| 7-210460 | 8/1995 | (JP) . |
| 8-161226 | 6/1996 | (JP) . |
| 11-161489 | 6/1999 | (JP) . |

OTHER PUBLICATIONS

Japanese Office Action dated Jan. 25, 2000 with partial translation.

\* cited by examiner

Primary Examiner—William M. Treat
Assistant Examiner—Walter Benson
(74) Attorney, Agent, or Firm—McGinn & Gibb, P.C.

(57) ABSTRACT

A prefetch controller includes a request address register containing an address associated with an access request, an address history table containing a history of accessed addresses, an adder generating a prefetch address, a plurality of subtracters each generating a difference between the address contained in the address history table and the address stored in the request address register, a selector selecting the output of one of the subtracters, and an address controller updating the address history table according to the address difference generated by the subtracter and issuing a prefetch request to cache memory. When a processor accesses data located at a regular interval, the prefetch controller predicts the address the processor is going to access and prefetches data at the address into the cache memory.

13 Claims, 8 Drawing Sheets

PREFETCH CONTROLLER AUTOMATICALLY UPDATING HISTORY ADDRESSES

BACKGROUND OF THE INVENTION

The present invention relates to a prefetch controller and more particularly to a prefetch controller which detects a regularity of addresses of data to be accessed sequentially and then prefetches data.

A conventional cache memory controller transfers data from a storage unit to cache memory when required data is not found in the cache memory (hereafter, this condition is called a cache miss). Further, as a software-controlled method, cache data prefetch instructions specify data to be transferred from a storage unit to cache memory in advance.

However, because the cache memory controller starts accessing the storage unit upon detection of a cache miss, it takes some time for the central processing unit to receive data and therefore cannot continue execution of an instruction requiring the data. Another problem is that a cache miss, if generated on a recent central processing unit having a pipeline installed for higher throughput, sometimes stops the pipeline, degrading the performance of the central processing unit.

In the software-controlled method, cache data prefetch instructions explicitly specifying prefetch operations in a program increase the program size, degrading performance. Another problem with this method is that it is usually impossible to predict correctly where access to the storage unit will be made within the program and, therefore, it is difficult to generate prefetch instructions at correct locations within the program at compilation time.

SUMMARY OF THE INVENTION

It is an object of the present invention to provide a prefetch controller which predicts access that will be made by the processor to consecutive addresses at a fixed interval and prefetches required data into cache memory in advance to increase system performance.

In one preferred embodiment, the prefetch controller according to the present invention has a history of request addresses issued from the processor to the cache memory and the difference between each request address and the previous request address. If the difference between the current request address and one of the request addresses in the history matches the difference corresponding to that request address in the history, the prefetch controller adds the address difference to the current request address to generate a prefetch address and issues a prefetch request specifying that prefetch address.

BRIEF DESCRIPTION OF THE DRAWINGS

Other features and advantages of the invention will bemade more apparent by the detailed description hereunder, taken in conjunction with the accompanying drawings, wherein.

DETAILED DESCRIPTION OF THE PREFERRED EMBODIMENTS

An embodiment of the present invention will be described in detail with reference to the attached drawings.

Figure 1:
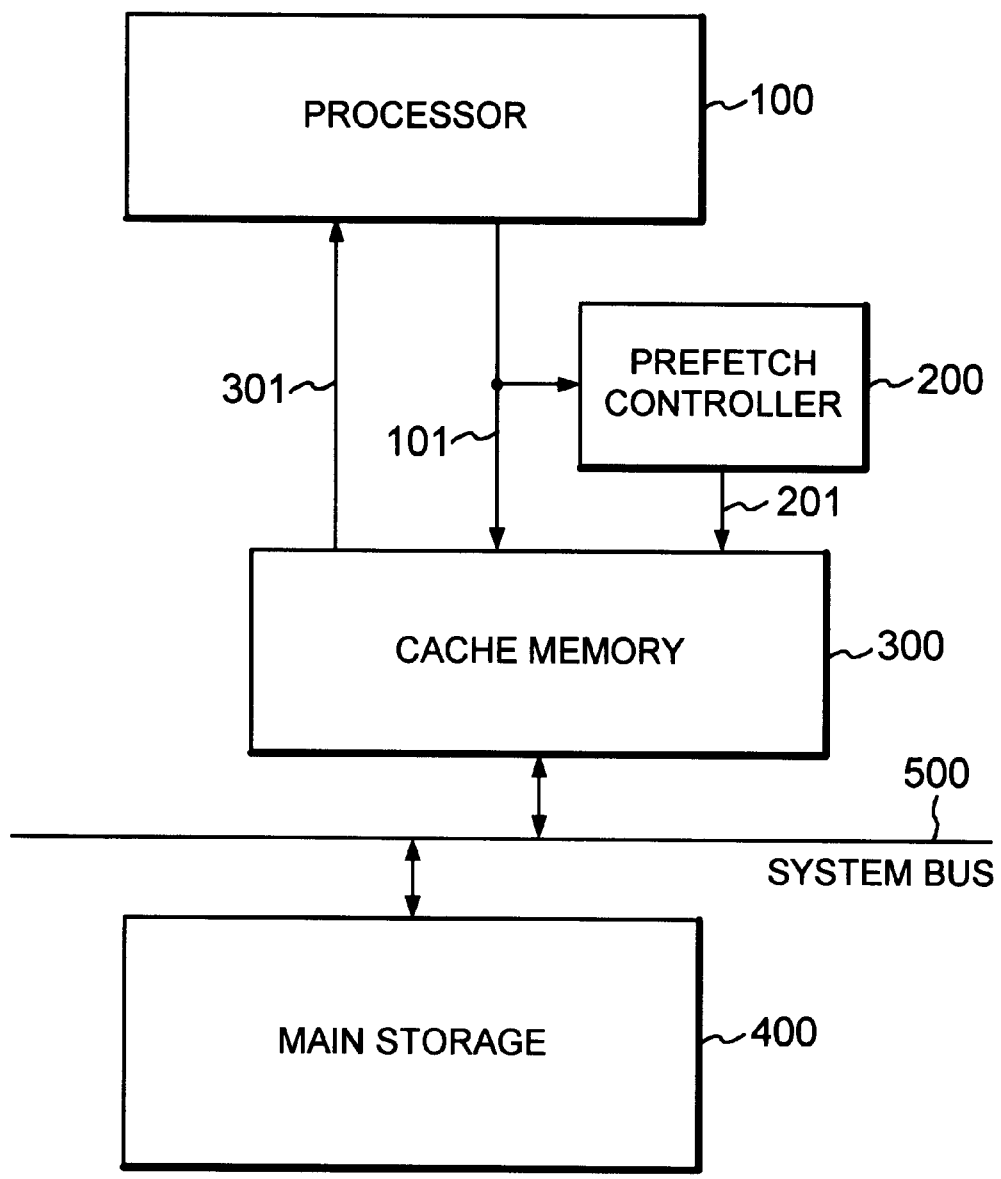
FIG. 1 is a block diagram showing a data processing system where one embodiment of a prefetch controller according to the present invention is applied.

FIG. 1 shows the embodiment of a prefetch controller 200 according to the present invention used in a data processing system comprising a processor 100, cache memory 300, and main storage 400. The prefetch controller 200 is located between, and connected to, the processor 100 and the cache memory 300. The cache memory 300 and the main storage 400 are connected via a system bus 500.

Upon receiving an access request from the processor 100 via a signal line 101, the cache memory 300 checks if it contains the requested data and, if it does (cache hit), sends the requested data to the processor 100 via a signal line 301. If the cache memory 300 does not contain the requested data (cache miss), it accesses the main storage 400 via the system bus 500 to read the requested data. The cache memory 300 stores the data in itself and, at the same time, sends the data to the processor 100 via the signal line 301.

The prefetch controller 200 checks access requests sent via the signal line 101 to see if they sequentially access data located at a regular interval of addresses and, if they do, issues a prefetch request to the cache memory 300. Upon receiving the prefetch request from the prefetch controller 200 via a signal line 201, the cache memory 300 does one of the following according to whether the prefetch request will result in a cache hit or a cache miss. That is, if the prefetch request results in a cache hit, the cache memory 300 does no operation with respect to the cache hit; if the prefetch request results in a cache miss, the cache memory 300 accesses the main storage 400 via the system bus 500 to read the requested data. In the latter case, the cache memory 300 holds the data but does not send it to the processor 100.

The cache memory 300 processes access requests from the processor 100 before those from the prefetch controller 200.

Unless otherwise mentioned, the processor 100, the cache memory 300, and the main storage 400 are standard units.

Figure 2:
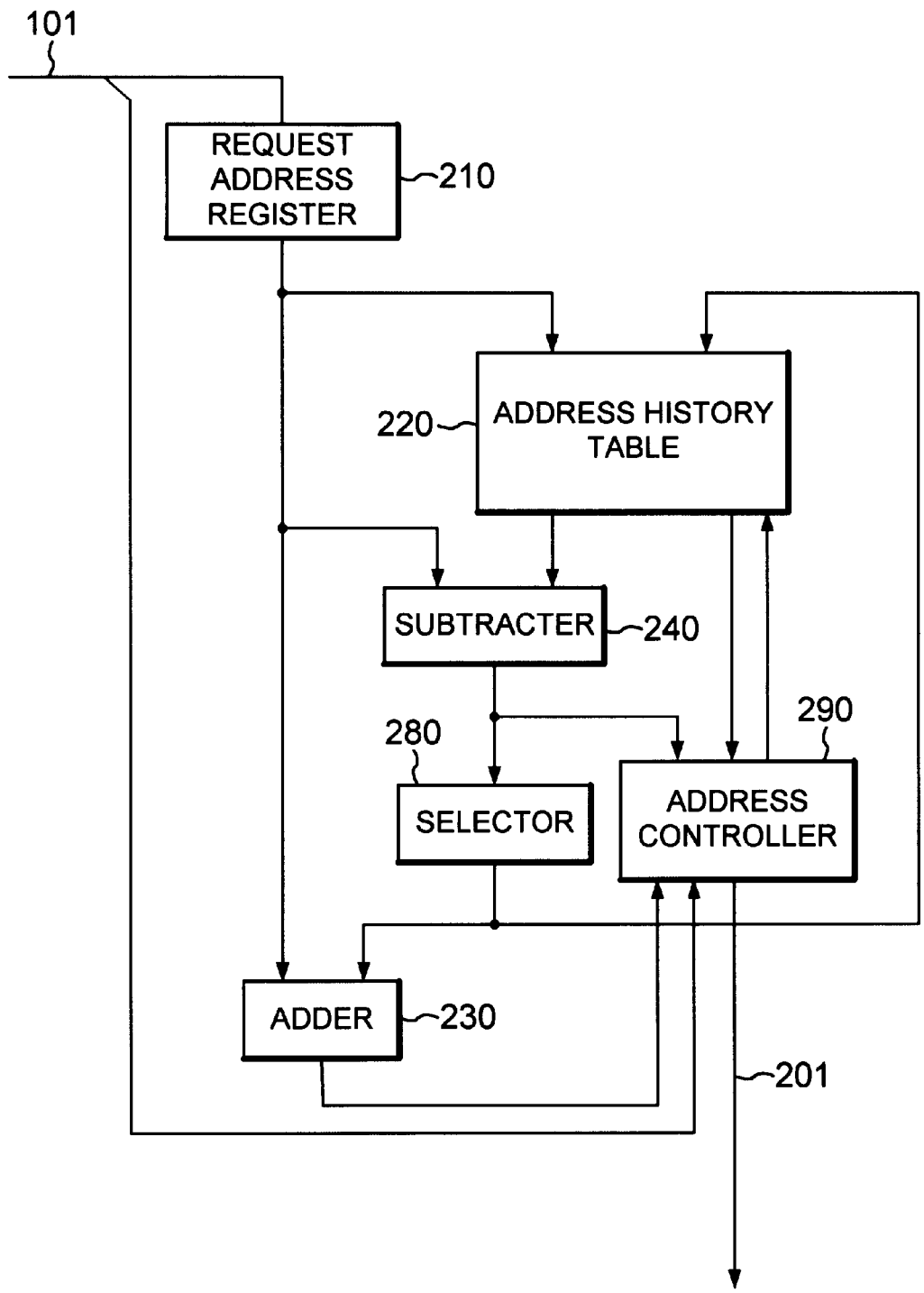
FIG. 2 is a diagram showing the overview of the embodiment of the prefetch controller according to the present invention.

Referring to FIG. 2, the prefetch controller 200 comprises a request address register 210 which contains the address specified by an access request, an address history table 220 which holds a history of accessed addresses, an adder 230 which generates a prefetch address, at least one subtracter 240 which generates the difference between an address stored in the address history table 220 and the address stored in the request address register 210, a selector 280 which selects the output from one of the subtracters 240, and an address controller 290 which updates the address history table 220 according to the address difference generated by the subtracter 240 and, at the same time, issues a prefetch request to the cache memory 300.

The address specified by an access request received via the signal line 101 is stored in the request address register 210 until the sequence of processing described below completes. The address history table 220 contains at least one entry, each entry containing an address accessed before (called a "history address") and a "difference" between the address and the address accessed immediately before that address. The subtracter 240 subtracts the corresponding history address stored in the address history table 220 from the address stored in the request address register 210 to generate an address difference. The selector 280 selects an address difference generated by the subtracter 240 according to an instruction from the address controller 290. The adder 230 adds the address difference selected by the selector 280 to the address stored in the request address register 210 to generate a prefetch address.

Figure 3:
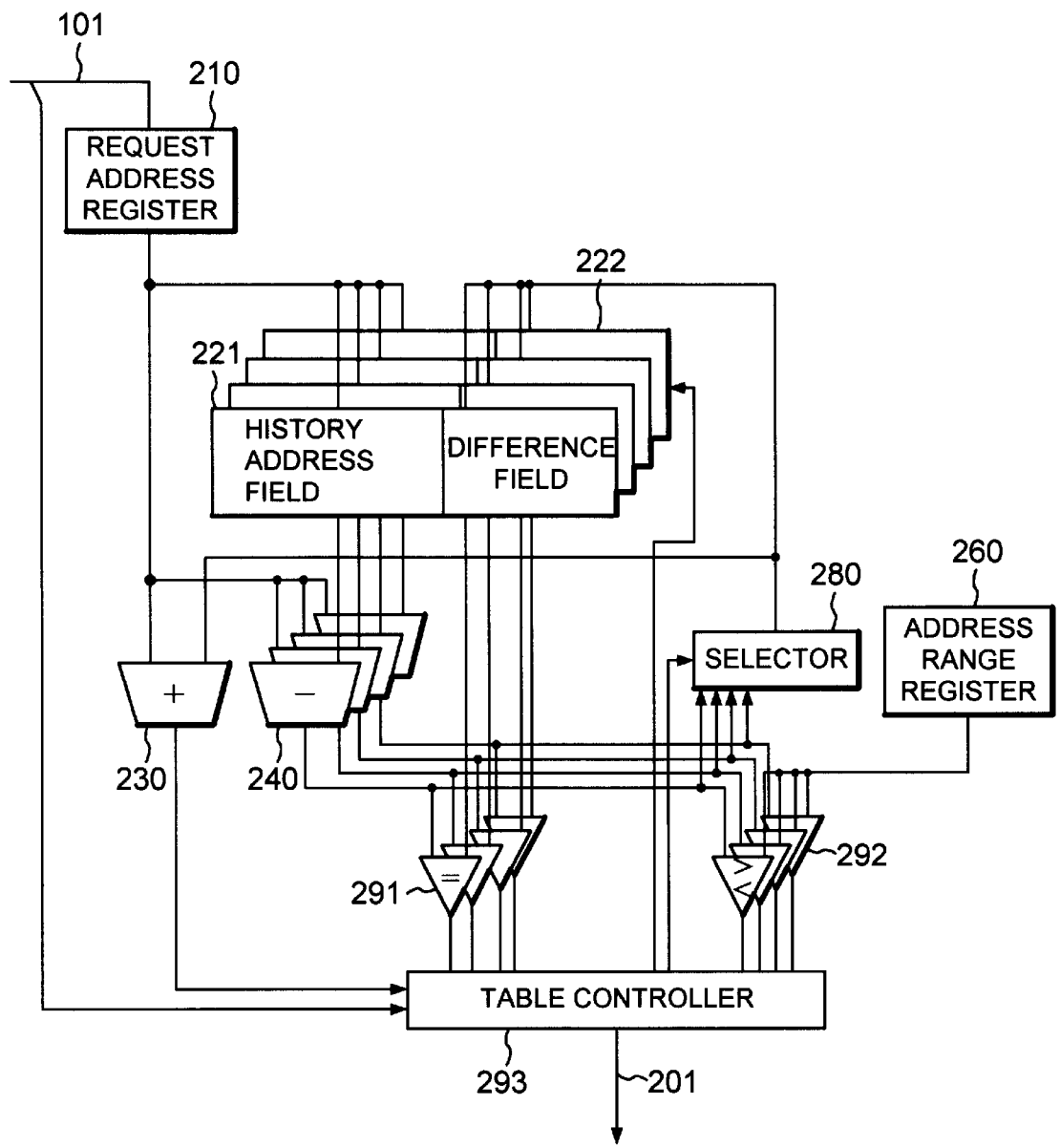
FIG. 3 is a block diagram showing the configuration of the embodiment of the prefetch controller according to the present invention.

FIG. 3 is a detailed block diagram of the prefetch controller 200. Each entry of the address history table 220 shown in FIG. 2 contains a history address field 221 and a difference field 222. Similarly, the address controller 290 shown in FIG. 2 contains an address range register 260, a comparator 291, a comparator 292, and a table controller 293. Although the address history table 220 in the embodiment shown in FIG. 3 contains four entries, the present invention allows any number of entries to be included in the table (at least one). It should be noted that the subtracter 240, comparator 291, and comparator 292 are provided for each entry of the address history table 220.

The comparator 291, also called a match comparator, compares the output from the corresponding subtracter 240 with the difference stored in the difference field 222 and outputs a result indicating whether or not they match. The address range register 260 contains a range value specifying the allowable range of the address difference. That is, the address difference, if within this range, is stored in the difference field 222. The comparator 292, also called a range comparator, compares the address difference generated by the subtracter 240 with the address range specified in the address range register 260 and outputs a result indicating if the difference is within the specified range. As will be described later, the table controller 293 sends a control signal to the selector 280 and, at the same time, updates the address history table 220. Also, based on the criteria which will be described later, the table controller 293 determines whether to issue a prefetch request specifying an address generated by the adder 230.

Figure 4:
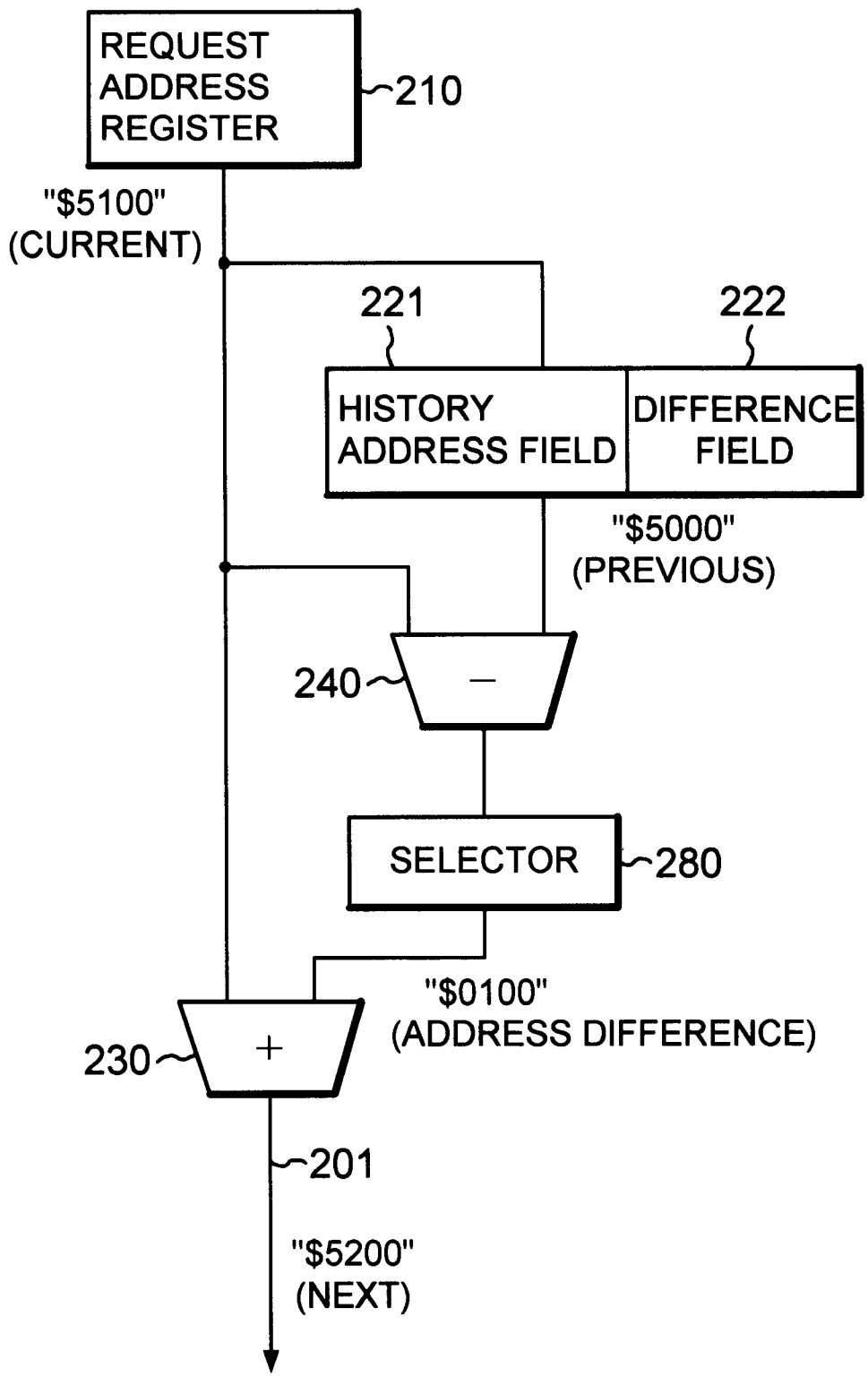
FIG. 4 is a diagram showing how addresses will be predicted in the embodiment according to the present invention.

FIG. 4 shows how a prefetch address is generated in the embodiment of the present invention. Assume that the history address field 221 contains an address accessed immediately before (for example, "$5000"). The subtracter 240 subtracts the address stored in the history address field 221 from the address (for example, "$5100") stored in the request address register 210 to generate an address difference (in this case, "$0100"). When the selector 280 selects this address difference, the adder 230 adds the address stored in the request address register 210 to this address difference to generate an address ("$5200").

The following describes the operation of the prefetch controller used in the embodiment.

Figure 5:
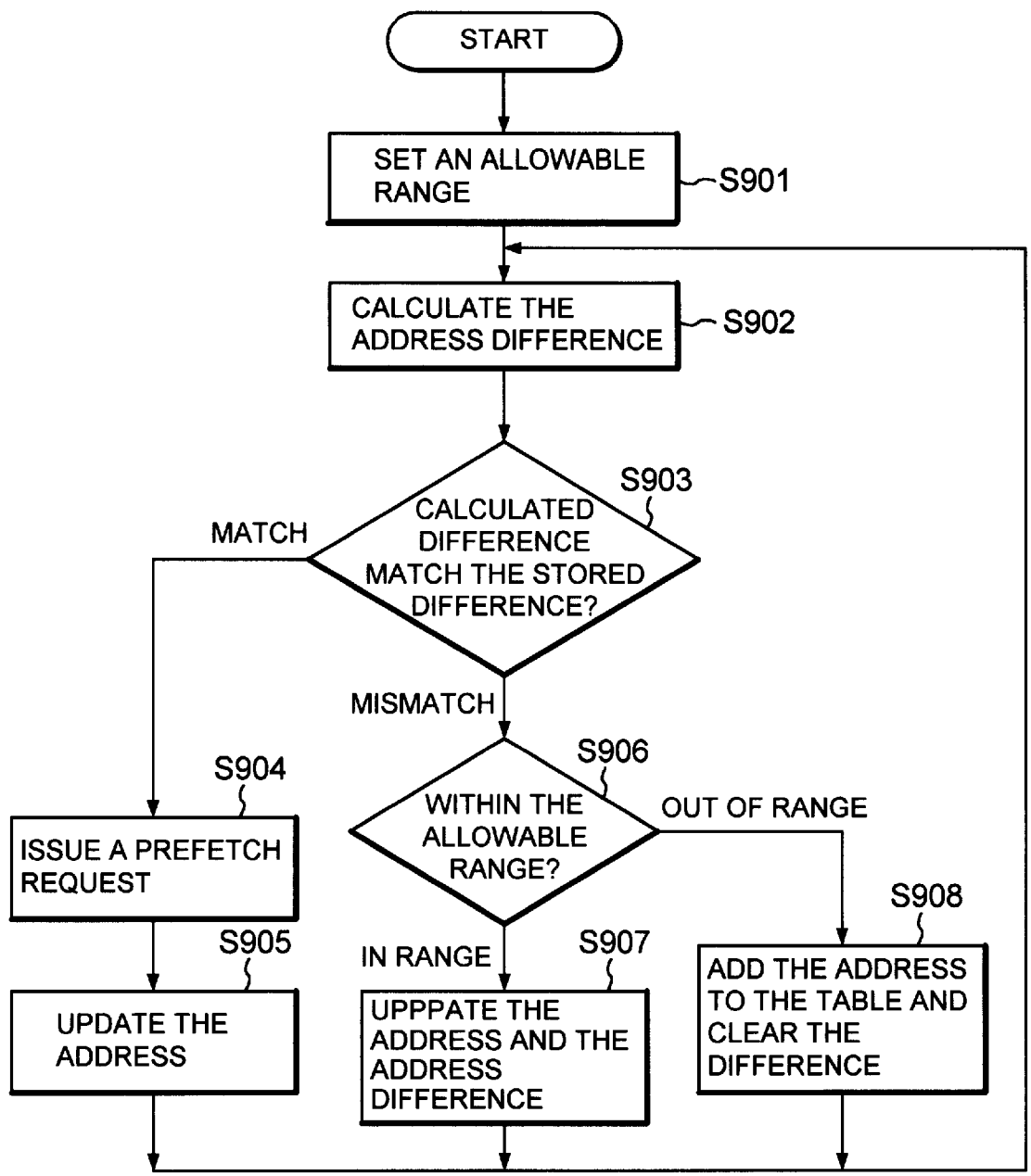
FIG. 5 is a flowchart showing the operation of the embodiment according to the present invention.

Referring to FIGS. 3 and 5, a range value acceptable for an address difference is specified in the address range register 260 (step S901).

When an address is stored in the request address register 210, each subtracter 240 subtracts the address stored in the corresponding history address field 221 from the address stored in the request address register 210 (step S902).

With respect to the subtraction result (address difference) generated by each subtracter 240, the comparator 291 checks if the generated address difference matches the difference stored in the corresponding difference field 222 (step S903). If the difference field 222 contains the difference equal to the one generated by the subtracter 240, the selector 280 selects that address difference. If there is more than one difference field 222 containing the difference equal to the one generated by the subtracter 240, the selector 280 selects one of address differences. The selected address difference is sent to the adder 230 to generate a prefetch address. The table controller 293 issues, via the signal line 201, a prefetch request specifying this prefetch address (step S904). After issuing the prefetch request, the table controller 293 stores the address stored in the request address register 210 into the history address field 221 corresponding to the difference field containing the difference selected by the selector 280 (step S905).

If the comparator 291 does not find a match in step S903, the comparator 292 checks if the address difference generated by each subtracter 240 is within the address range specified in the address range register 260 (step S906). If, in step S906, the address generated by the subtracter 240 is determined to be within the address range, the table controller 293 does not issue a prefetch request on the assumption that the access request is requesting for data not recorded at an interval of a fixed address difference. In this case, the selector 280 selects from the address history table 220 the entry whose difference field 222 contains the address difference determined by the comparator 292 to be within the address range. The history address field 221 of the entry is updated by the address in the request address register 210, and the difference field 222 is updated by the address difference selected by the selector 280 (step 907).

If, in step S906, the address generated by the subtracter 240 is determined not to be within the address range, the table controller 293 does not issue a prefetch request on the assumption that the access request is requesting for data required only once or data located in an area not yet recorded in the address history table 220. In this case, the table controller 293 selects an entry from the address history table 220, stores the address stored in the request address register 210 into the history address field 221 of that entry, and clears the corresponding difference field 222 to zero (step S908). Any entry of the address history table 220 may be selected or an entry least recently selected by the comparator 291 may be selected. The table controller 293 clears the difference field 222 to zero to prevent the difference from being determined to be within the range the next time control is passed to step S906. Not only a zero but also any value outside the range specified in the address range register 260 may be used.

After executing step S905, S907, or S908, control is passed back to step S902 and, when an address is set in the request address register 210, each subtracter 240 calculates the address difference.

The following describes an example of the embodiment according to the present invention.

Figure 6A:
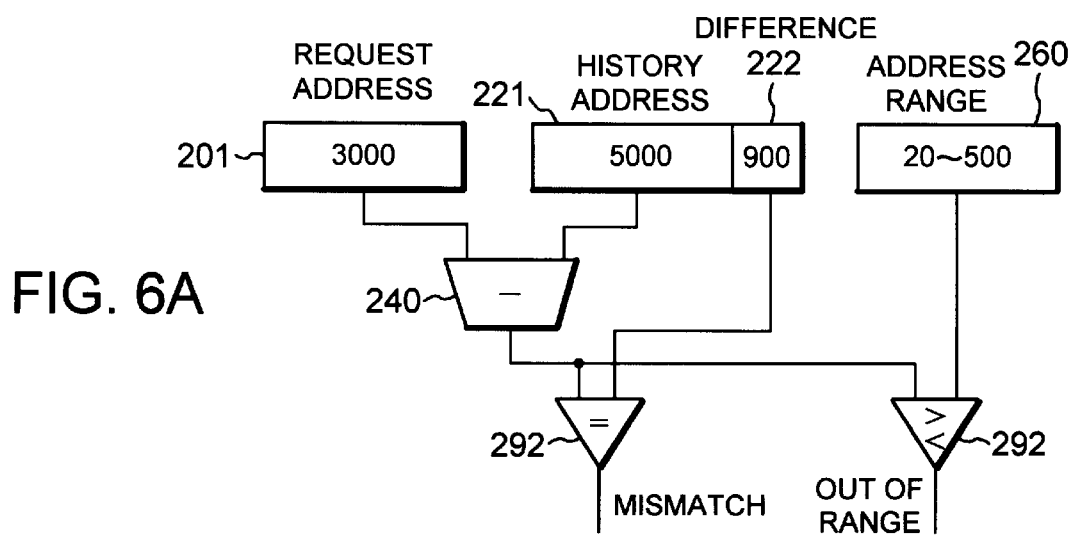
FIG. 6A shows an initial state in an example of the embodiment according to the present invention.

Referring to FIG. 6A, the history address field 221 initially contains "5000", the difference field 222 contains "900", and the address range register 260 contains "20–500". If "3000" is set in the request address register 210, the comparator 291 outputs the result indicating a "mismatch" and the comparator 292 outputs the result indicating an "out-of-range" condition. Therefore, the address stored in the request address register 210 is stored in the history address field 221 with the difference field 222 cleared to "zero" (step S908 in FIG. 5).

Figure 6B:
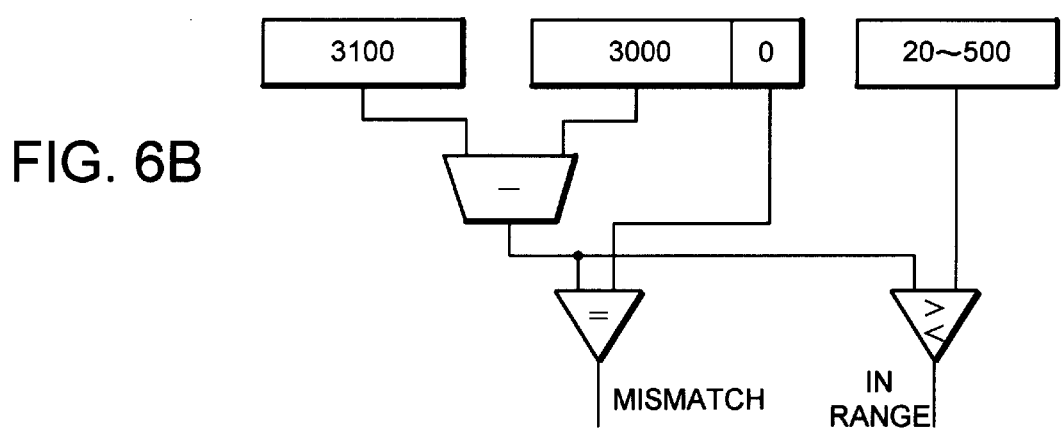
FIG. 6B shows a second state in the example of the embodiment according to the present invention.

Referring to FIG. 6B, if "3100" is set in the request address register 210, the comparator 291 outputs the result indicating a "mismatch" and the comparator 292 outputs the result indicating an "in-range" condition. Therefore, the history address field 221 is updated with "3100" which is the address stored in the request address register 210, with the address difference of "100" in the difference field 222 (step S907 in FIG. 5).

Figure 6C:
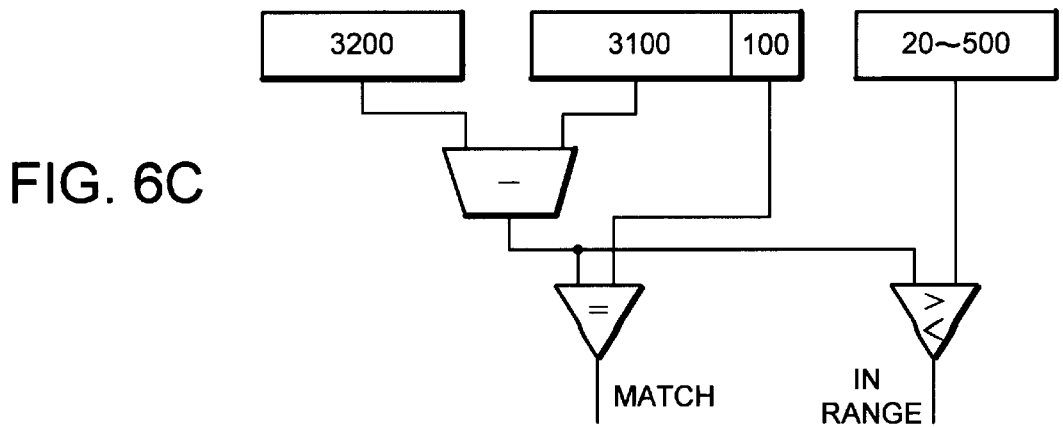
FIG. 6C shows a third state in the example of the embodiment according to the present invention.

Referring to FIG. 6C, if "3200" is set in the request address register 210, the comparator 291 outputs the result indicating a "match" and the comparator 292 outputs the result indicating an "in-range" condition. Therefore, a prefetch request specifying the address of "3300" generated by the adder 230 is issued and, at the same time, the history address field 221 is updated with "3200" which is the address stored in the request address register 210 (steps S904 and S905 in FIG. 5). Thereafter, as long as the request address is increased by "100", a prefetch request is issued in advance.

In the above description, although the copy-back method is used for the cache memory 300, the write-through method may also be used. In that case, prefetching is meaningless for a write access request sent from the processor 100. The prefetch controller 200 may ignore write access requests and treat only read access requests from the processor 100 as access requests.

In the above embodiment, as long as the difference between the address stored in the history address field 221 and the address stored in the request address register 210 matches the difference in the difference field 222, a prefetch request may be issued. And, the value in the difference field 222, if lost, may be recovered if the difference between the addresses of two successive access requests is within the range stored in the address range register 260. This allows subsequent prefetch requests to be issued.

Next, an alternate embodiment of the present invention will be described.

The basic configuration of the alternate embodiment is the same as that of the embodiment described above except the cache memory 300.

Figure 7:
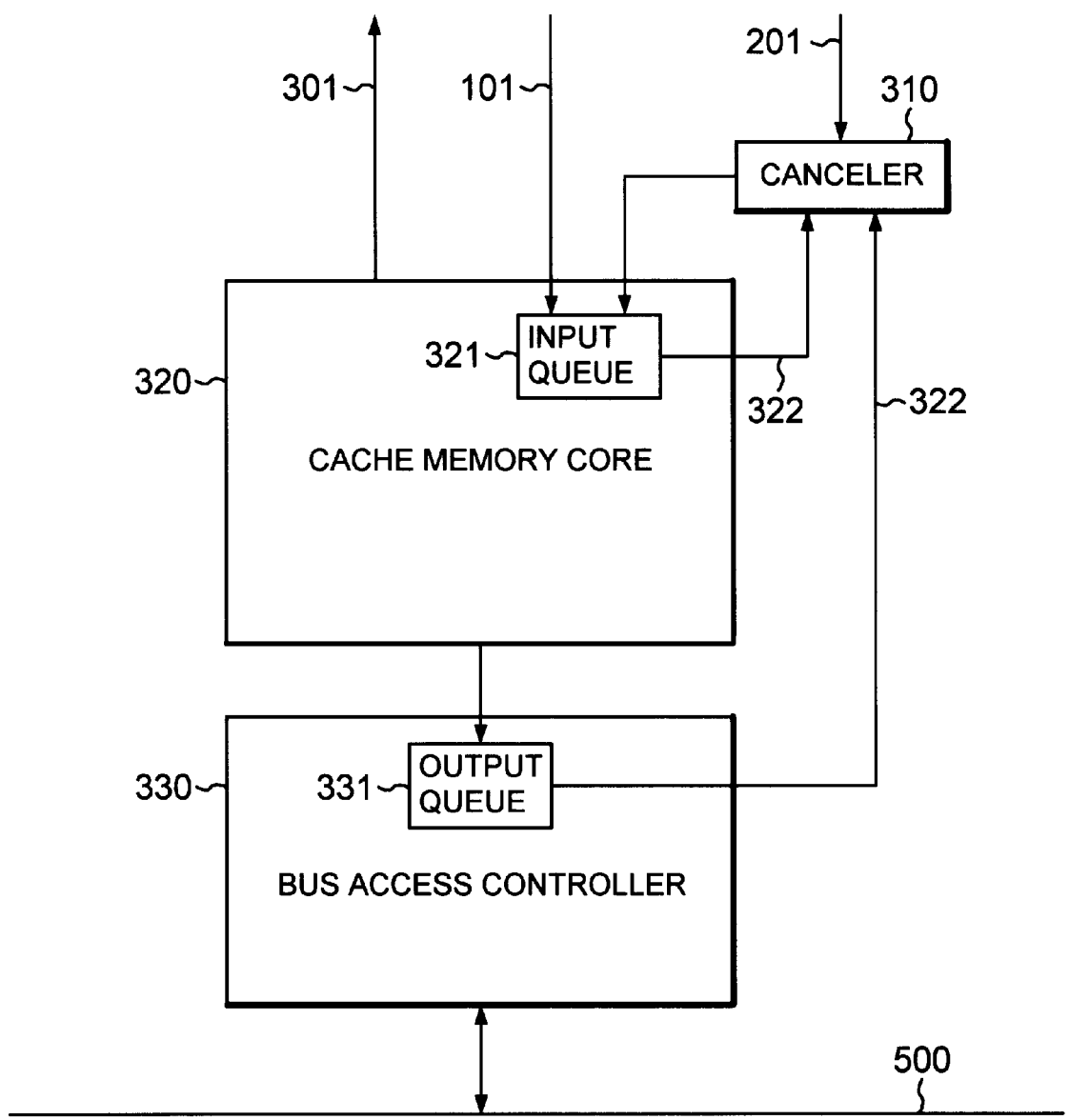
FIG. 7 is a block diagram showing a variation of cache memory used in the embodiment according to the present invention.

Referring to FIG. 7, the cache memory 300 used in the alternate embodiment includes an input queue 321 in which access requests to be sent to a cache memory core 320 are stored, an output queue 331 in which access requests to be sent from the cache memory core 320 to a bus access controller 330 are stored, and a canceler 310 which monitors the input queue 321 and output queue 331 via wait state signal lines 322 and 332 to cancel prefetch requests. The cache memory core 320 refers to the main components of the cache memory such as an address array and a data array. The bus access controller 330 controls the transfer of data from the cache memory core 320 to the system bus 500.

Figure 8:
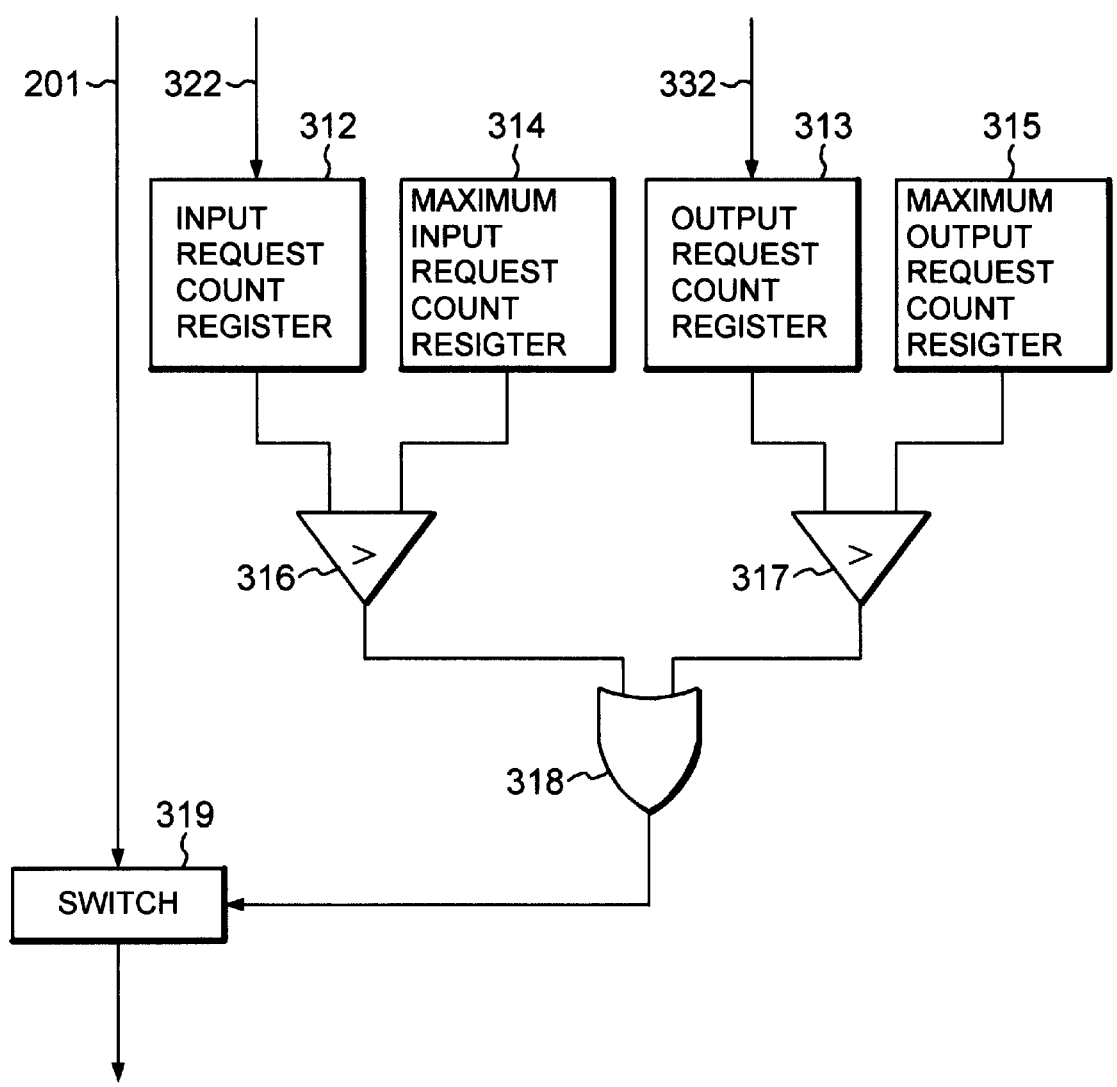
FIG. 8 is a diagram showing the configuration of a canceler used in the variation of the embodiment according to the present invention.

Referring to FIG. 8, the canceler 310 includes an input request count register 321 which contains the number of requests stored in the input queue 321, an output request count register 313 which contains the number of requests stored in the output queue 331, a maximum input request count register 314 which contains the maximum number of requests that may be stored in the input queue 321, and a maximum output request count register 315 which contains the maximum number of requests that may be stored in the output queue 331. The canceler 310 comprises a comparator 316 which compares the value of the input request count register 312 with the value of the maximum input request count register 314 to see if the former is larger than the latter, a comparator 317 which compares the value of the output request count register 313 with the value of the maximum output request count register 315 to see if the former is larger than the latter, a logical OR circuit 318 which generates a prefetch stop signal when the detection signal is issued from the comparator 316 or comparator 317, and a switch 319 which determines whether to send prefetch requests via the signal line 201.

The maximum input request count register 314 and the maximum output request count register 315 usually contain a predetermined maximum value in advance, respectively. If the number of requests in the input queue 321 exceeds the value of the maximum input request count register 314 or if the number of requests in the output queue 331 exceeds the value of the maximum output request count register 315, the output of the logical OR circuit 318 is asserted to open the switch 319, preventing prefetch requests from being sent via the signal line 201.

Therefore, in this alternate embodiment, when the processing load on the cache memory 300 or system bus 500 becomes high, the canceler 310 cancels prefetch requests sent via the signal line 201. This prevents less urgent data from being prefetched, thus increasing overall system performance.

As has been described in the foregoing, when the processor accesses data located at a regular interval of a fixed address difference, the prefetch controller according to the present invention predicts the next address the processor is going to access and prefetches data at that address from main storage into cache memory in advance, allowing the processor to access data more quickly and thereby increasing overall system performance. In the meantime, the prefetch controller prevents data not located at a regular interval from being prefetched, making small-amount cache memory more efficient and thus increasing system performance.

The invention may be embodied in other specific forms without departing from the spirit or essential characteristic thereof. The present embodiments is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A prefetch controller, keeping a history of a request address sent from a processor to a cache memory and an address difference between a current request address and the history of the request address and, if a difference between an address associated with the current request and the history of the request address matches said address difference, issuing a prefetch instruction to said cache memory, said prefetch instruction specifying the address generated by adding said address difference to the address associated with the current request.

2. A prefetch controller, comprising:

an address history table including a history address field containing a history of a request address sent from a processor to a cache memory and an address difference field containing an address difference between a current request address and the history of the request address;

a subtracter subtracting an address associated with the current request from the request address contained in the history address field of the address history table;

an adder adding the output of the subtracter to the address associated with the current request; and an address controller issuing a prefetch request with the output of said adder as a prefetch address if the output of said subtracter matches said address difference contained in said address history table.

3. The prefetch controller according to claim 2, wherein said address controller includes a match comparator for checking if the output of said subtracter matches the address difference contained in said address history table and, issues the prefetch request with the output of said adder as the prefetch address if the match comparator indicates a match.

4. The prefetch controller according to claim 2, wherein said address controller further includes an address range register for storing a range value acceptable as said address difference and, stores the output of said subtracter into said address difference field of said address history table if the output of said subtracter is within the range value stored in said address range register.

5. The prefetch controller according to claim 4, wherein said address controller further includes a range comparator for checking if the output of said subtracter is within the range value stored in said address range register and, stores the output of said subtracter into said address difference field of said address history table if the range comparator indicates an in-range condition.

6. The prefetch controller according to claim 5, wherein, if said range comparator indicates an out-of-range condition, said address controller stores the address associated with said current request into said history address field of said address history table and, at the same time, sets an out-of-range value in said address difference field.

7. A prefetch controller, comprising:

an address history table for having at least two entries, each entry including a history address field containing a history of a request address sent from a processor to a cache memory and an address difference field containing an address difference between a current request address and the history of the request address;

a plurality of subtracters each for subtracting an address associated with the current request from the request address contained in the corresponding history address field of the address history table;

a selector for selecting one of outputs of said plurality of subtracters;

an adder for adding the output selected by said selector to the address associated with the current request; and an address controller for requesting said selector to select, if the output of one of said plurality of subtracters matches the corresponding address difference stored in said address history table, the output of the subtracter and issuing a prefetch request with the output of said adder as a prefetch address.

8. The prefetch controller according to claim 7, wherein said address controller includes a plurality of match comparators each for checking if the output of the corresponding subtracter matches the corresponding address difference contained in said address history table and, issues the prefetch request with the output of said adder as the prefetch address, if one of the match comparators indicates a match.

9. The prefetch controller according to claim 7, wherein said address controller further includes an address range register for storing a range value acceptable as said address difference and, stores the output of said subtracter into said address difference field of said address history table if the output of said subtracter is within the range value stored in said address range register.

10. The prefetch controller according to claim 9, wherein said address controller further includes a plurality of range comparators each for checking if the output of the corresponding subtracter is within the range value stored in said address range register and, stores the output of the corresponding subtracter into the corresponding address difference field of said address history table if one of the plurality of range comparators indicates an in-range condition.

11. The prefetch controller according to claim 10, wherein, if all of said plurality of range comparators indicate an out-of-range condition, said address controller stores the address associated with said current request into one of said history address fields of said address history table and, at the same time, sets an out-of-range value in the corresponding address difference field.

12. A data processing system comprising a processor, a main storage, a cache memory connected to and located between said processor and said main storage, and a prefetch controller issuing a prefetch request based on a request address sent from said processor to said cache memory, wherein said prefetch controller includes:

an address history table for having a history address field containing a history of a request address sent from said processor to said cache memory and an address difference field containing an address difference between a current request address and the history of the request address;

a subtracter subtracting an address associated with the current request from the request address contained in the history address field of the address history table;

an adder adding the output of the subtracter to the address associated with the current request; and an address controller issuing a prefetch request with the output of said adder as a prefetch address if the output of said subtracter matches said address difference contained in said address history table.

13. The data processing system according to claim 12, wherein said cache memory includes:

a queue for storing waiting requests; and a canceler for canceling the prefetch request sent from said prefetch controller if one of the queues contains more requests than a predetermined count.

* * * * *